May 26, 1925.  
H. R. BARKMEYER  
ELECTRIC FURNACE  
Filed Aug. 7, 1924

Inventor:  
Henry R. Barkmeyer,  
Williams, Bradbury,  
McCaleb & Hinkle, Attys.

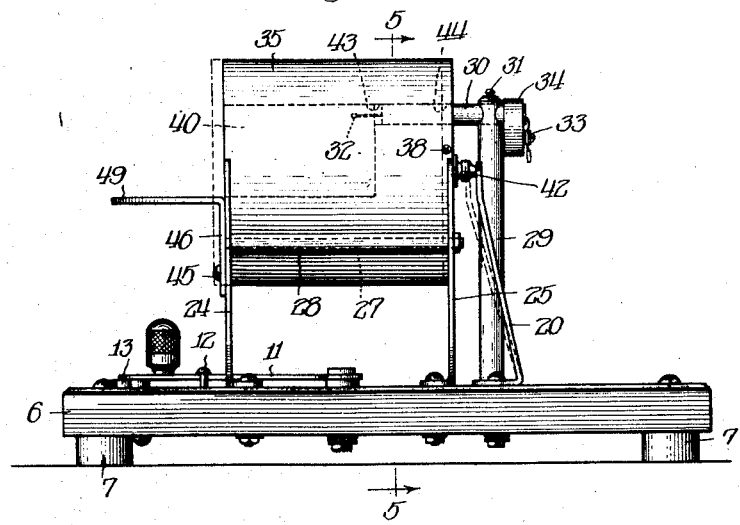

Patented May 26, 1925.

1,538,880

UNITED STATES PATENT OFFICE.

HENRY R. BARKMEYER, OF CHICAGO, ILLINOIS.

ELECTRIC FURNACE.

Application filed August 7, 1924. Serial No. 730,570.

*To all whom it may concern:*

Be it known that I, HENRY R. BARK-MEYER, a citizen of the United States, and resident of Chicago, in the county of Cook and State of Illinois, have invented a certain new and useful Improvement in Electric Furnaces, of which the following is a full, clear, concise, and exact description, reference being had to the accompanying drawing, forming a part of this specification.

My invention relates to electric furnaces and more particularly to an improved muffle furnace which is admirably suited for use by dentists for fusing porcelain, gold, etc. in the preparation of dental restorations.

It is highly desirable that a muffle furnace for dental use be equipped with exceptionally accurate means for indicating the temperature existing within the muffle, the temperature indicator usually being in the form of an electric meter of the indicating type connected with a thermo-couple located within the muffle chamber. In the prior art the thermo-couples have been carried by the muffles and in practical use have been inseparable parts thereof so that the electrical connections between the indicating instruments and their sources of energy, i. e. the thermo-couples, have had to be broken and reestablished every time a muffle has been removed from or replaced with the other parts of the furnace structure with which it co-operates. In the prior art the substitution of one muffle for another has necessarily involved a substitution of thermo-couples as well.

In order to secure best results from a temperature indicator of the thermo-couple type it is desirable that the instrument be very delicately calibrated with respect to the thermo-couple with which it is used and that the resistance in the electrical connections between the instrument and the thermo-couple remain constant after the calibration has been effected. The temperature indicating equipment heretofore commonly supplied in connection with muffle furnaces for dental use has been deficient, firstly, in that the disturbance of electrical connections between the instrument and the thermo-couple, which has been incidental to the removal and replacement of a muffle, often has caused a variation in the resistance of these connections and, secondly because the substitution of muffles, involving as it has a substitution of thermo-couples, often has thrown the indicating instrument out of calibration. Furthermore, the matter of connecting and disconnecting an indicating instrument with a thermo-couple is an operation which if properly and carefully done, consumes considerable time and is for that reason objectionable.

My present invention among its several objects contemplates the provision of a furnace of the removable muffle type in which a single thermo-couple may be used in conjunction with a plurality of muffles and need not be electrically disconnected from the indicating instrument when any muffle is removed from the other elements of the furnace structure.

In the accompanying drawings illustrating a preferred embodiment of my invention Figure 1 is a front elevational view of an electric furnace equipment embodying my invention;

Figure 3 is an end elevation of the furnace equipment, this view illustrating in detail the muffle and the other parts of the furnace equipment closely associated therewith;

Figure 4 is a rear elevational view of the parts shown in Figure 3, and

Figure 5 is a vertical section taken on the line 5—5 of Figure 3 and looking in the direction indicated by arrows.

Similar characters of reference refer to similar parts throughout the several views.

Figure 1:
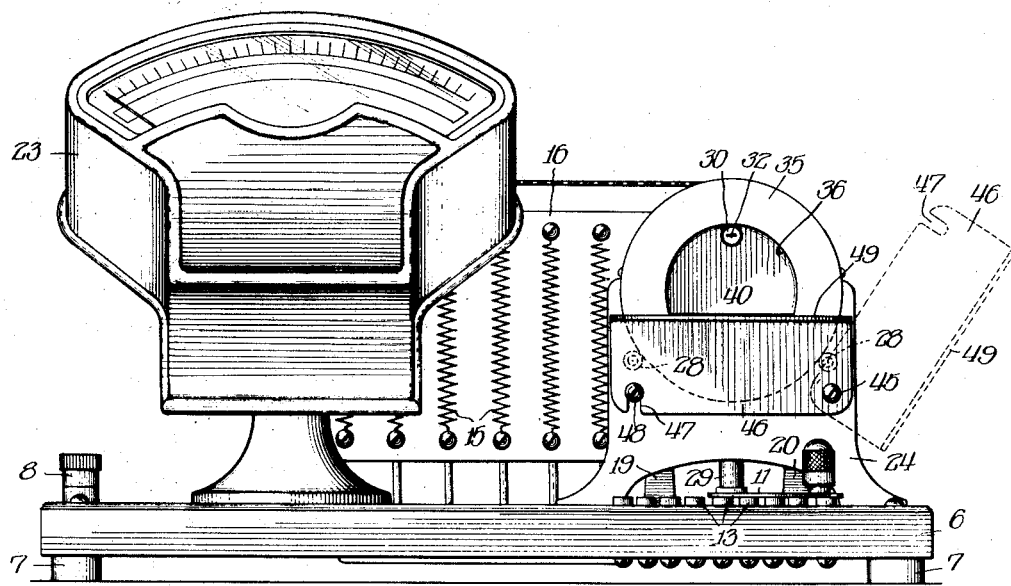

Referring to the drawings reference numeral 6 indicates a base plate of slate or other dielectric material which is preferably provided at its corners with feet 7 to support its lower surface and the conductors extending across that surface above a table or other support upon which the furnace structure may be mounted.

Figure 2:
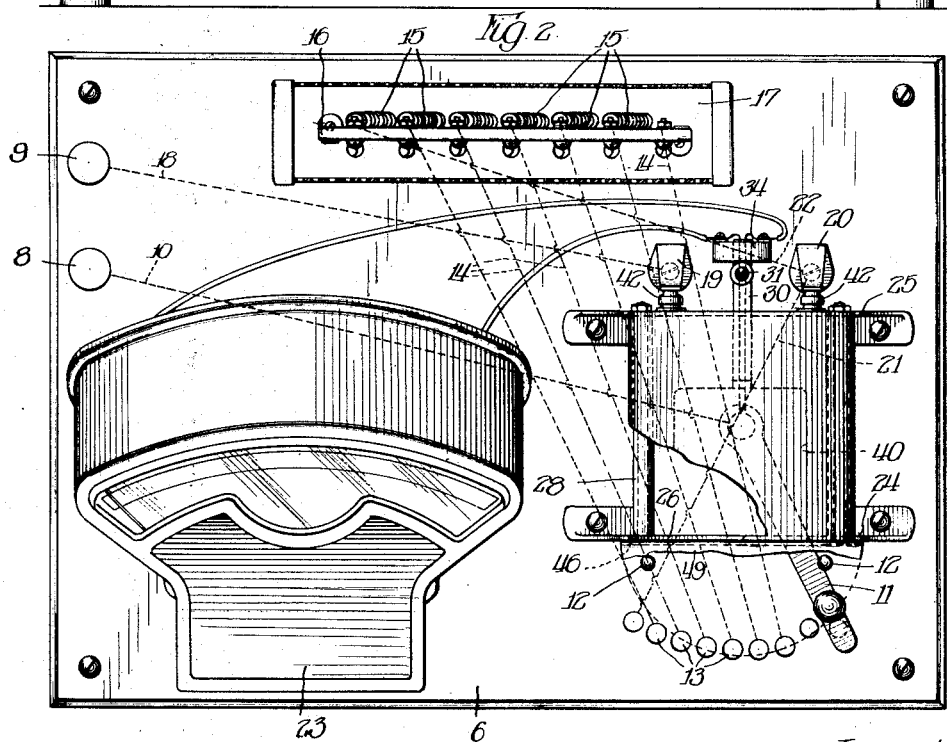
Figure 2 is a top plan thereof, certain of the electrical connections being indicated by dotted lines.

The plate 6 is provided with a pair of binding posts 8 and 9 adapted to be connected with any suitable source of electrical energy such for instance as the light circuit in a dentist's office. The terminal 8 is connected by a conductor 10 with a pivoted arm 11 which acts as the movable element of a rheostat controller and which operates between stop pins 12—12 and over buttons 13—13 to vary the resistance of a circuit including the heating element of the muffle presently to be described in detail. It will be noted that two of the buttons 13 are "dead," i. e. not electrically connected with any rheostat coil. This is to insure that when the operator moves the arm 11 to its "off" position (that is, to the right as viewed in Figure 2) he will not be likely to leave the arm in any position where by arcing or otherwise it will permit any current to traverse the circuit controlled by such arm. The others of the contact buttons 13 are electrically connected by conductors 14 with the several rheostat coils 15 which conveniently are mounted upon an insulating plate 16 of lava or other suitable material which is vertically supported on the base plate 6 and is preferably encased in a housing 17, the front, back and top walls of which are preferably formed of perforated metal to permit the free circulation of air around the rheostat coils. The circuit arrangement is such that when the arm 11 is moved from right to left (Figure 2) it will first close a circuit of considerable resistance and then progressively eliminate resistance from the circuit as it travels over the contact buttons 13—13.

The binding post 9 is connected by a conductor 18 with a spring contact 19, this spring contact being in the form of a leaf spring having its lower end secured to the base plate 6 and adapted at its upper end to co-operate with one of the hereinafter mentioned terminals of the heating element of the muffle. Spaced from the spring contact 19 is a similar spring contact 20 which is also adapted to co-operate with one of the hereinafter mentioned terminals of the heating element of the muffle. The spring contact 20 is connected by a conductor 21 with the left-hand (Figure 2) button 13 and by a conductor 22 with the left-hand terminal of the rheostat coil structure.

Mounted upon the base plate 6 is an electrical measuring instrument 23 which is preferably of the indicator pointer type and is preferably calibrated in degrees Fahrenheit or centigrade.

Those parts of the furnace structure thus far described may be varied considerably without departing in any way from the invention hereinafter claimed. I shall now proceed with a description of those parts of the furnace structure with which the present invention is particularly concerned.

Mounted on the base plate 6 in front of the hereinbefore mentioned spring contacts 19 and 20 is a muffle cradle which comprises spaced front and rear plates 24 and 25 each of which is conveniently secured to the plate 6 by screws as illustrated. These plates are provided with semi-circular upper edges 26 which serve to embrace the ends of the cylindrical muffle housing presently to be mentioned. It will be noted that the plates 24 and 25 are connected by rods 27 whereon are mounted sleeves 28 which serve as guides for the muffle when the latter is moved into and out of the cradle in the manner presently to be described.

Disposed behind the muffle cradle and preferably located midway between the spring contacts 19 and 20 is a post 29 which has its lower end rigidly anchored to the base plate 6. At its upper end the post 29 is provided with a horizontal cylindrical passage in which is disposed a cylinder 30 of lava or other heat resisting electrical insulating material. The lava cylinder 30 is held in position in the post 29 by small set screw 31.

The lava cylinder 30 is provided with two parallel longitudinal passages for the wires of a thermo-couple which are coupled in the usual manner at 32 and have their rear ends led to terminals 33 which are carried by a disc of insulating material 34. The said insulating disc is provided with an aperture for the reception of the rear end of the lava cylinder 30 and is preferably rigidly secured to the post 29 by a screw 31 (see Figure 4). The terminals 33—33 are connected by conductors 33ª—33ª with the terminals (not shown) of the temperature indicating instrument 23 which has been carefully calibrated to indicate in terms of degrees Fahrenheit or centigrade the temperature to which the thermo-couple 32 is subjected.

At 35 I have illustrated the muffle housing which is in the form of a metal can or cylinder which at its forward end is provided with an opening 36 through which access to the interior of a muffle can be had, this opening preferably being formed with a straight lower edge and an arch as illustrated. The rear end of the muffle housing is closed by a disc 37 which is formed of some good dielectric heat insulator such for instance as a hard molded composition comprising asbestos fibre as one of its constituents. The disc 37 is preferably held in position by a pair of diametrically opposite screws 38.

Contained within the muffle housing 35 is the usual fire clay 39 which may or may not be separated from the cylindrical wall of the muffle housing by a layer of insulating material such as asbestos fibre or a composition comprising asbestos fibre. The fire clay 39 is molded to form a tunnel-like heating chamber 40 the front end of which registers with the hereinbefore mentioned opening 36 in the front end of the muffle housing. Embedded in the fire clay in the usual manner and turned around the chamber 40 is the electrical heating element 41, the terminals of which are extended rearwardly throughout the fire clay and through the disc 37 to terminal buttons 42—42 carried by the said disc 37, these terminal buttons being adapted to engage the spring contacts 19 and 20 to which I have previously alluded.

Formed in the fire clay 39 is a horizontal cylindrical passage 43 which leads from the upper end of the chamber 40 to a registering opening 44 in the disc 37. When the muffle is in the position illustrated in the drawings the element 30 extends into and closes the passage 43 and its registering opening 44, the thermo-couple being located within the heating chamber 40.

Pivoted to the cradle plate 24 by screw 45 is a locking element 46 which is adapted to hold the muffle in its cradle with the contact buttons 42—42 in engagement with the spring contacts 19 and 20. This locking element is in the form of a plate notched at 47 to co-operate with a screw 48 also carried by the cradle plate 24. It will be noted that the plate 46 is provided with a flange 49 which when the plate is in the locking position, illustrated by full lines in Figure 1, constitutes a shelf registering with the bottom of the heating chamber 40.

When the muffle is to be removed from the other elements of the furnace structure the locking plate 46 is moved to the dotted line position of Figure 1, whereupon the muffle may be moved forwardly on the guiding sleeves 28—28 of the cradle, the thermo-couple being left rigidly mounted on the post 29 without its electrical connection with the indicating instrument being in any way disturbed. When the same or a similar muffle is to be placed in the cradle it is placed upon the guide sleeves 28 with its passage 43 in registry with the lava insulator 30 of the thermo-couple and is then moved rearwardly on the guides 28 until the contact buttons 42 firmly engage the spring contacts 19 and 20. When the muffle has been moved rearwardly to a position such that its forward end lies flush with the forward surface of the plate 24 the locking element 46 is moved to the full line position of Figure 1, whereupon the muffle is supported by the cradle and is clamped between the locking element 46 and the spring contacts 19 and 20.

From the foregoing description it will be understood that the heating element of the muffle is placed in operative relation to its power circuit and is disconnected from such circuit simply by the insertion of the muffle and its cradle and its removal therefrom, and that the removal of a muffle or the substitution of muffles does not necessitate any tampering with the electrical connections between the thermo-couple and the temperature indicating instrument.

Having thus illustrated and described a preferred embodiment of my invention what I claim is new and desire to secure by Letters Patent of the United States is:

1. In an apparatus of the class described, a muffle, a support therefor, an opening in the muffle extending outwardly from the heating chamber thereof, and a thermo-couple fixed with respect to the support and adapted to enter the heating chamber through said opening when the muffle is moved to operative position on the said support.

2. In an electric furnace, a muffle cradle, a muffle removably mounted in the cradle, an opening in the muffle for the reception of a thermo-couple, and temperature-indicating apparatus including a thermo-couple comprising portions adapted to occupy and close said opening when the muffle is moved to operative position in the cradle.

3. In an apparatus of the class described, the combination of a cradle, a temperature-indicating instrument and a thermo-couple mounted and carried together as a unit, said thermo-couple being permanently electrically connected with said instrument, a muffle removably supported in said cradle, and an opening in the muffle adapted to receive the thermo-couple and to permit the same to enter the heating chamber of the muffle when the latter is moved to operative position in the cradle.

4. In an apparatus of the class described, a muffle support, a muffle removably carried by said support and provided with an opening extending outwardly from the heating chamber thereof together with a thermo-couple fixed with respect to said support and comprising a heat-resisting insulator adapted to occupy said opening and to close the same when the muffle is moved to operative position on said support.

5. In an apparatus of the class described, a muffle support, a muffle removably carried by said support and temperature-indicating mechanism including a thermo-couple separate from said muffle and fixed with respect to said support adapted to extend into the heating chamber of the muffle when the latter is in operative position on the support.

6. In an apparatus of the class described, a muffle, a cradle, said muffle being horizontally slidable on and off of said cradle, a horizontal passage extending outwardly from the heating chamber of the muffle in a line parallel with the movement of the muffle on and off of said cradle, and temperature-indicating mechanism comprising a thermo-couple supported adjacent to said cradle and adapted to extend into said passage when the muffle is in operative position on the cradle.

7. In an apparatus of the class described, a muffle, a cradle, said muffle being adapted to move horizontally on and off of said cradle, a horizontal passage extending outwardly from the heating chamber of the muffle in a line parallel with the line of movement of the muffle with respect to the cradle, temperature-indicating mechanism comprising a thermo-couple separate from said muffle supported adjacent the cradle, said thermo-couple being adapted to pass into and occupy said passage when the muffle is moved to its operative position on the cradle, spring means tending to move the muffle from its operative position on said cradle, and releasable locking means carried by the cradle for holding the muffle in operative position on the cradle notwithstanding the said tendency of said spring means.

8. In combination, a muffle, a horizontal cradle therefor, said muffle being adapted horizontally to move onto and off of the cradle, said muffle comprising a heating element and terminal contact buttons therefor on one end of the muffle, spring contacts disposed adjacent to said cradle and adapted to bear firmly against said contact buttons when the muffle is in operative position on the cradle, and releasable locking means carried by the cradle adapted to hold the muffle in operative position notwithstanding the pressure of said spring contacts.

9. In combination, a muffle, a horizontal cradle therefor, said muffle being adapted horizontally to move onto and off of the cradle, said muffle comprising a heating element and terminal contact buttons therefor on one end of the muffle, spring contacts disposed adjacent to said cradle and adapted to bear firmly against said contact buttons when the muffle is in operative position on the cradle, releasable locking means carried by the cradle adapted to hold the muffle in operative position notwithstanding the pressure of said spring contacts, a horizontal passage in said muffle leading from the heating chamber to the end of the muffle which carries said contact buttons, and temperature-indicating mechanism comprising a thermo-couple supported adjacent said cradle and adapted to extend into said passage when the muffle is in operative position in the cradle.

10. In an apparatus of the class described, a muffle, a horizontal muffle cradle on and off of which the muffle is horizontally moved, an electrical heating element carried by the muffle, said heating element being connected with terminal contact buttons located on the rear end of said muffle, spring contact fingers adapted to bear tightly against said buttons and tending to move the muffle horizontally on the cradle, releasable locking means for holding the muffle on the cradle comprising a plate hingedly mounted on the cradle and adapted to be swung in front of the forward portion of the muffle, a horizontal passage in the muffle extending from the heating chamber thereof to that end of the muffle by which the said terminal contact buttons are carried, a thermo-couple support located adjacent that end of the muffle by which the contacts are carried, and a horizontally disposed thermo-couple carried by said support and adapted to lie in and close the aforesaid passage when the muffle is locked in operative position in the cradle.

In witness whereof, I hereunto subscribe my name this 4th day of August, 1924.

HENRY R. BARKMEYER.

Witnesses:
HELEN G. DREVNIAK,
EDNA V. GUSTAFSON.